US012782655B2

(12) United States Patent
Takezaki

(10) Patent No.: US 12,782,655 B2
(45) Date of Patent: Nov. 3, 2026

(54) OPTICAL CONNECTOR, OPTICAL CONNECTOR CONNECTING STRUCTURE, AND OPTICAL PACKAGING CIRCUIT

(71) Applicant: HAKUSAN INC., Ishikawa (JP)

(72) Inventor: Motohito Takezaki, Ishikawa (JP)

(73) Assignee: HAKUSAN INC., Ishikawa (JP)

( * ) Notice: Subject to any disclaimer, the term of this patent is extended or adjusted under 35 U.S.C. 154(b) by 288 days.

(21) Appl. No.: 18/574,631

(22) PCT Filed: Aug. 19, 2022

(86) PCT No.: PCT/JP2022/031323
§ 371 (c)(1),
(2) Date: Dec. 27, 2023

(87) PCT Pub. No.: WO2023/022219
PCT Pub. Date: Feb. 23, 2023

(65) Prior Publication Data

US 2024/0176083 A1 May 30, 2024

(30) Foreign Application Priority Data

Aug. 20, 2021 (JP) ................................ 2021-135189

(51) Int. Cl.
*G02B 6/42* (2006.01)
*G02B 6/32* (2006.01)
(Continued)

(52) U.S. Cl.
CPC ............ *G02B 6/4231* (2013.01); *G02B 6/32* (2013.01); *G02B 6/3814* (2013.01);
(Continued)

(58) Field of Classification Search
CPC ....... G02B 6/32; G02B 6/3882; G02B 6/4231
See application file for complete search history.

(56) References Cited

U.S. PATENT DOCUMENTS

2002/0154870 A1* 10/2002 Mowry ................ G02B 6/4225 385/88
2009/0162018 A1 6/2009 Hayase et al.
(Continued)

FOREIGN PATENT DOCUMENTS

JP S53141592 A 12/1978
JP 62-212609 A 9/1987
(Continued)

OTHER PUBLICATIONS

International Search Report (ISR) dated Sep. 20, 2022 filed in PCT/JP2022/031323.

*Primary Examiner* — Charlie Y Peng
(74) *Attorney, Agent, or Firm* — RANKIN, HILL & CLARK LLP

(57) ABSTRACT

[Problem] To provide an optical connector, an optical connector connecting structure, and an optical packaging circuit, with which it is possible to, in high-density packaging of optical fibers, prevent spring force required for the connector from increasing and achieve size reduction. [Solution] This optical connector is provided with: a first ferrule 110 having a first end surface 112 in which an optical fiber insertion hole 114 into which an optical fiber 30 is inserted and a pair of guide pin insertion holes 116 into which a pair of guide pins 40 are inserted are formed; and a plate-shaped lens holding member 200 bonded to the first end surface 112 of the first ferrule 110 via a refractive index matching adhesive layer. The lens holding member 200 has a member main body 210 and a GRIN lens 250 provided on the member main body 210, and the GRIN lens 250 is optically coupled to the optical fiber 30.

8 Claims, 18 Drawing Sheets

(51) Int. Cl.
*G02B 6/38* (2006.01)
*G02B 6/40* (2006.01)

(52) U.S. Cl.
CPC ......... *G02B 6/3839* (2013.01); *G02B 6/3882* (2013.01); *G02B 6/403* (2013.01); *G02B 6/4268* (2013.01); *G02B 6/4292* (2013.01)

(56) References Cited

U.S. PATENT DOCUMENTS

| | | | |
|---|---|---|---|
| 2014/0003767 | A1 | 1/2014 | Jong et al. |
| 2014/0321814 | A1 | 10/2014 | Chen et al. |
| 2015/0104135 | A1 | 4/2015 | Bushnell et al. |
| 2015/0370017 | A1 | 12/2015 | Moriyama et al. |
| 2016/0004021 | A1 | 1/2016 | Pelletier et al. |

FOREIGN PATENT DOCUMENTS

| | | | | |
|---|---|---|---|---|
| JP | 2014191202 | A | * | 10/2014 |
| JP | 2016-95431 | A | | 5/2016 |
| JP | 2017-161831 | A | | 9/2017 |
| JP | 2018013564 | A | | 1/2018 |
| JP | 2020-122816 | A | | 8/2020 |
| WO | 2000/08503 | A1 | | 2/2000 |
| WO | 2019/244388 | A1 | | 12/2019 |

* cited by examiner

[Fig1]
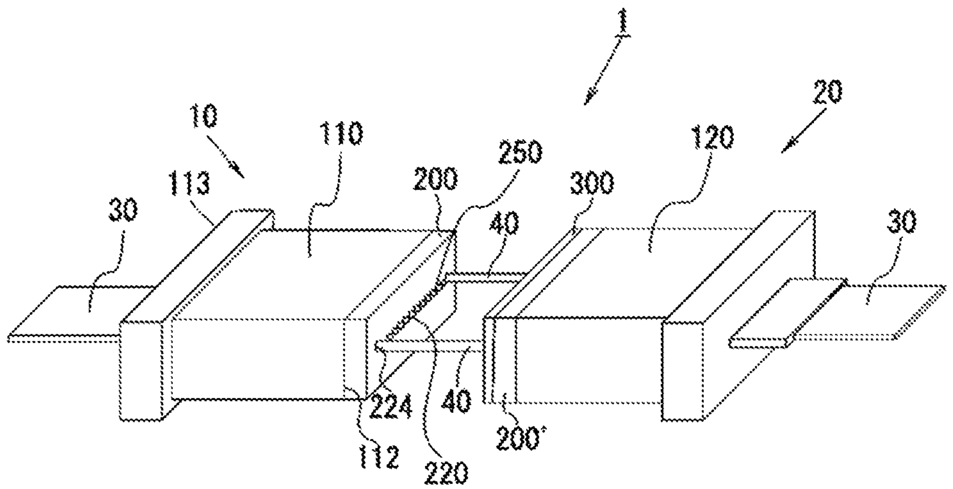

[Fig2]
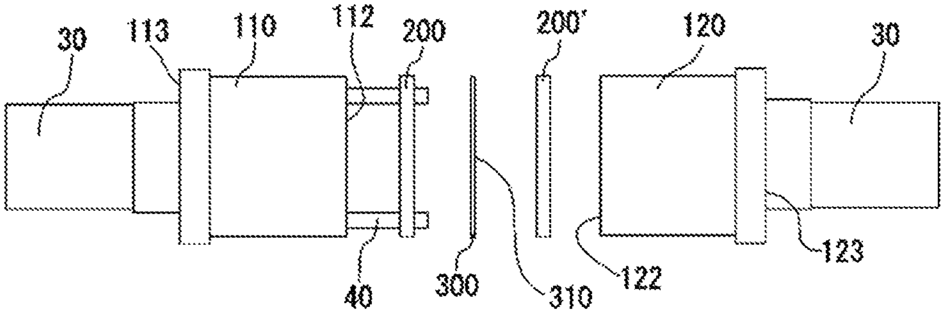

[Fig3]
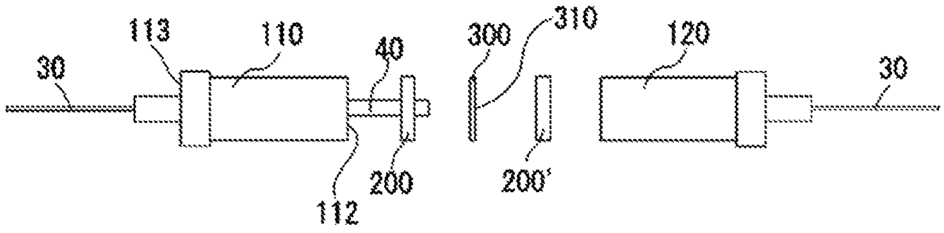

[Fig4]
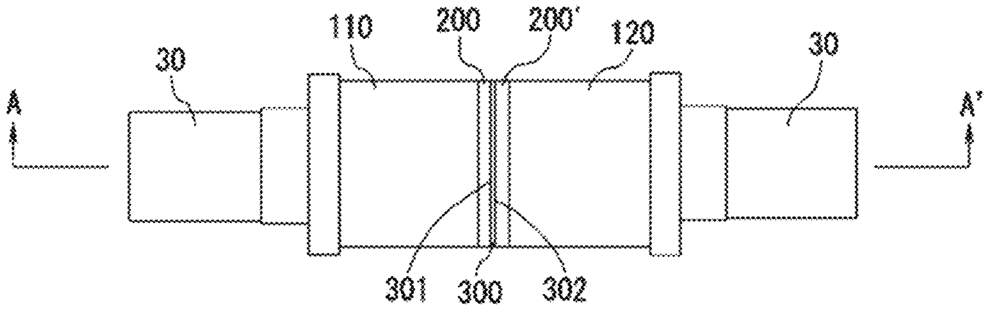

[Fig5]
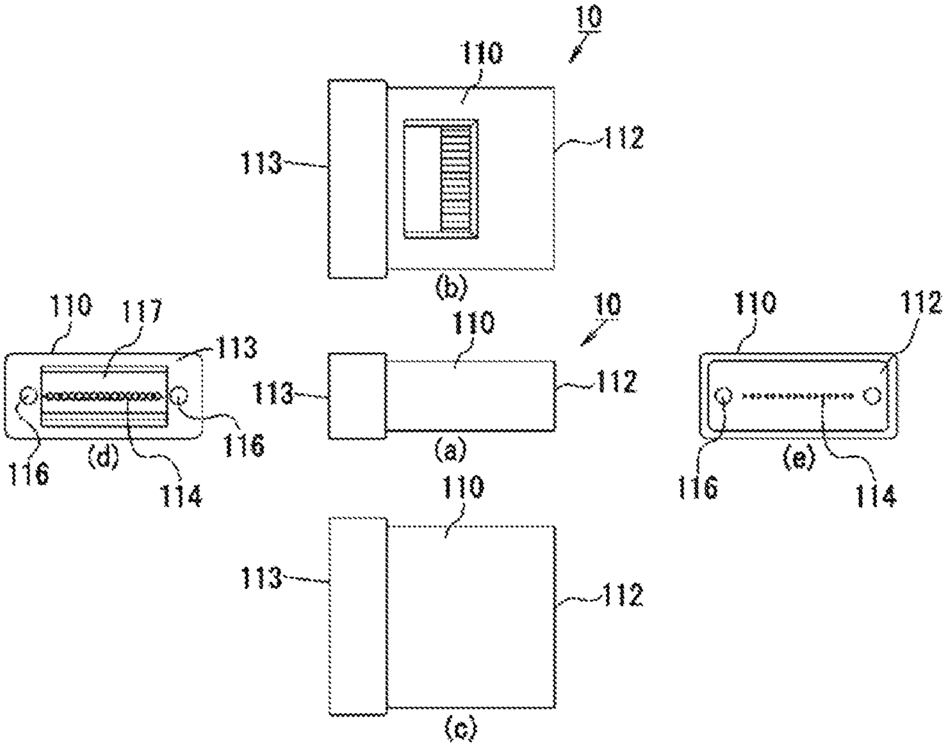

[Fig6]
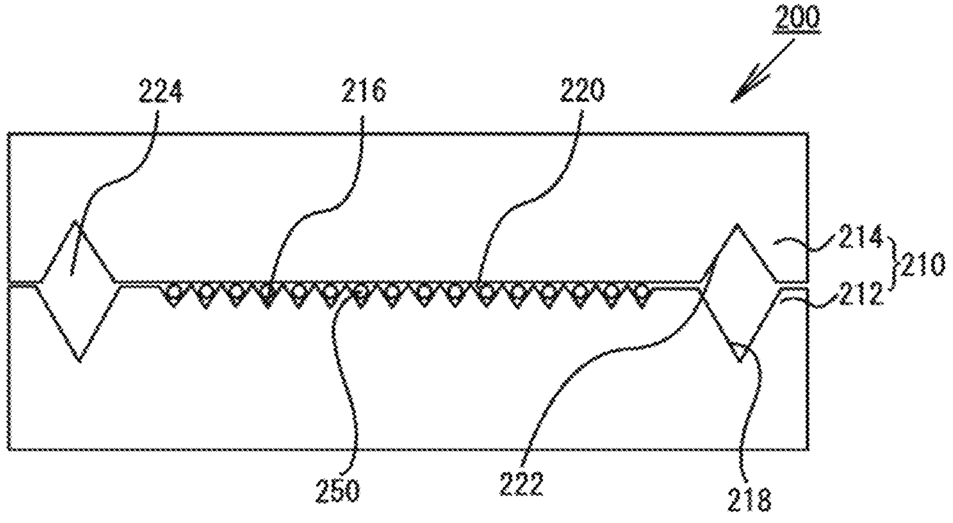

[Fig7]
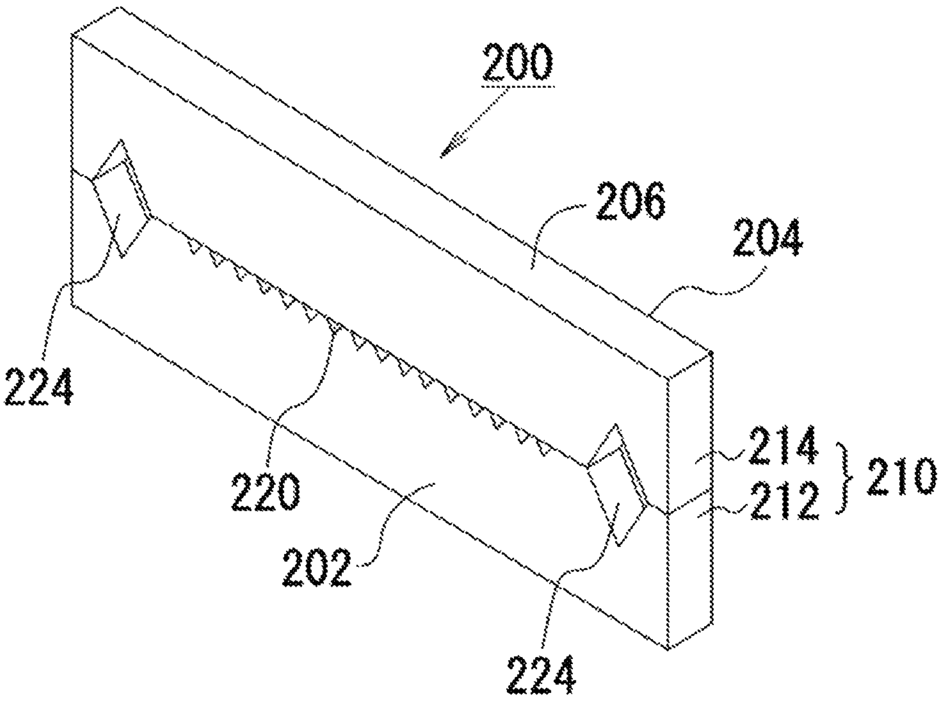

[Fig8]
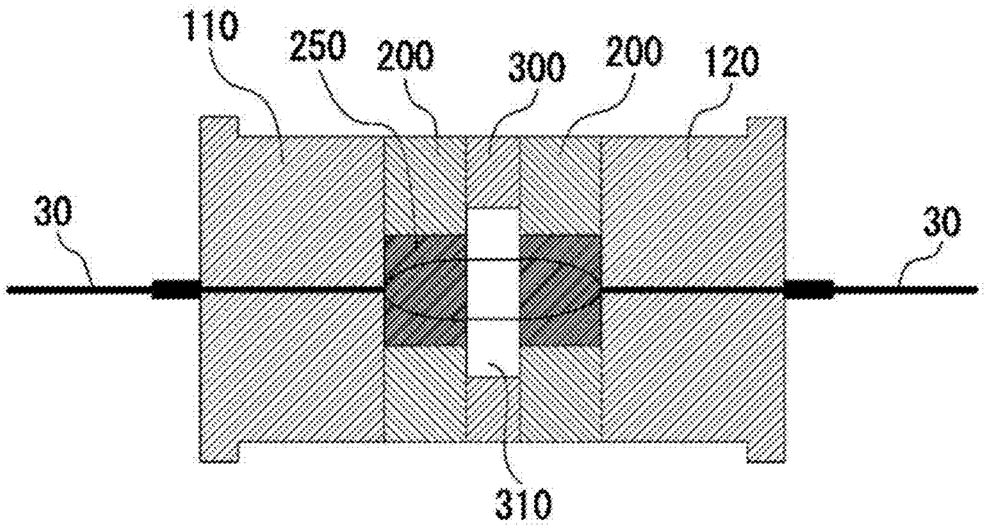

[Fig9]
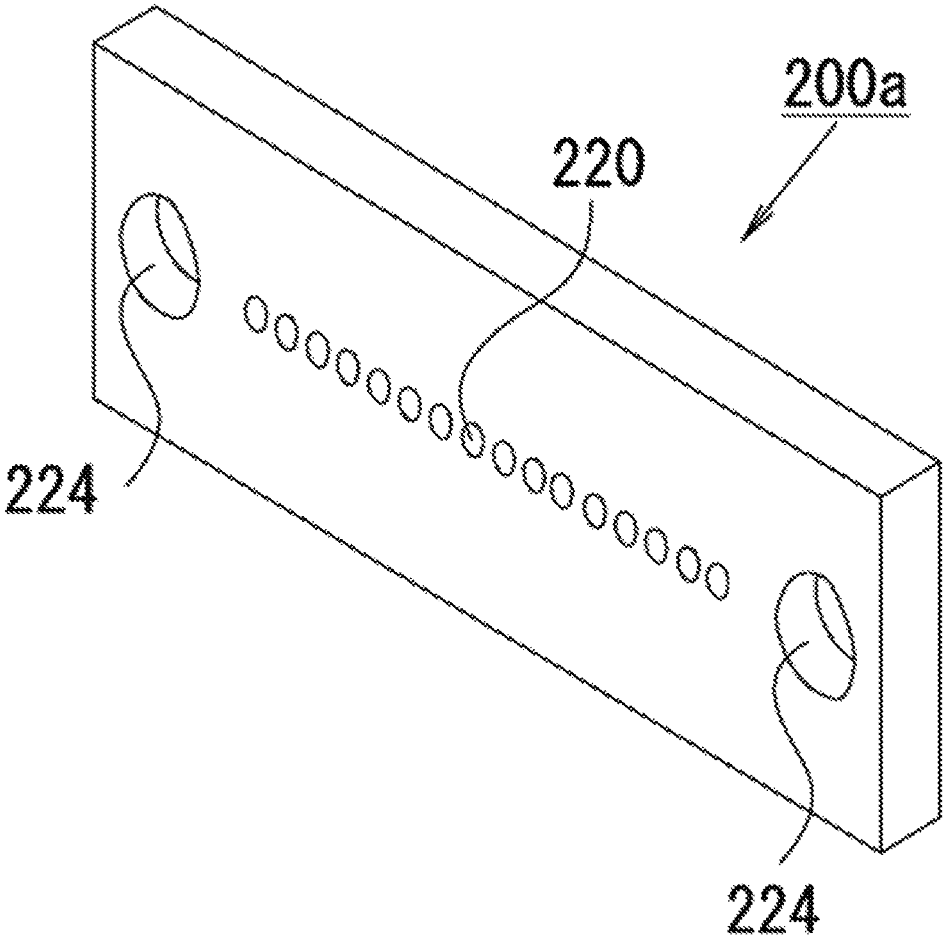

[Fig10]
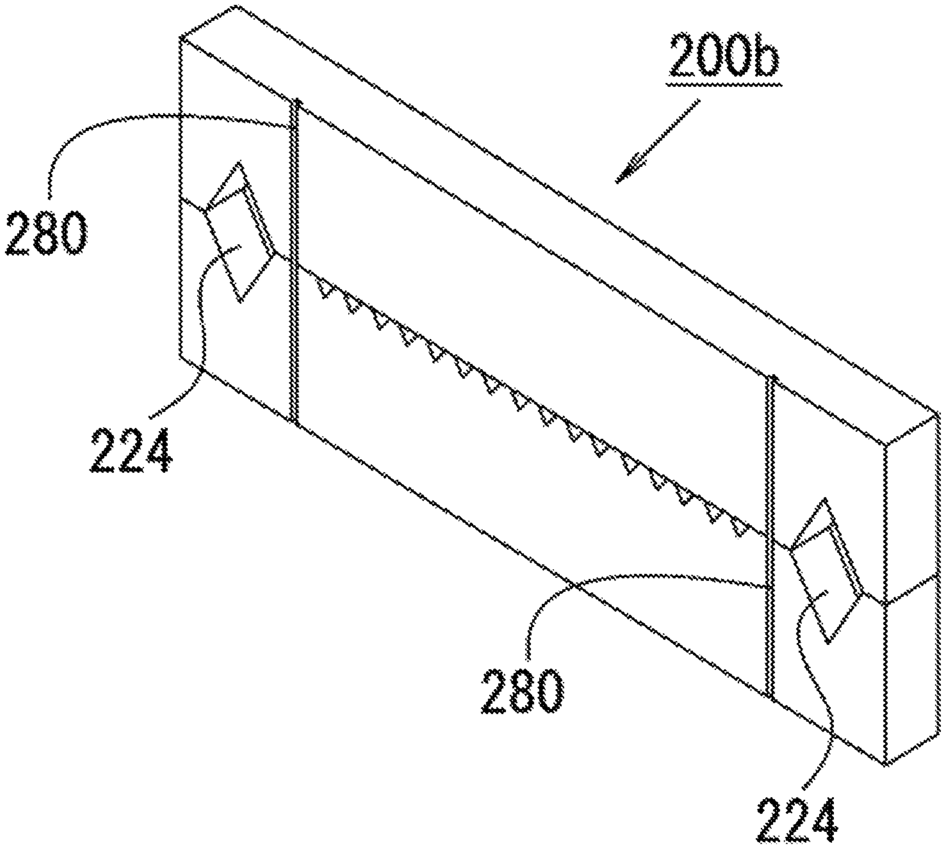

[Fig11]
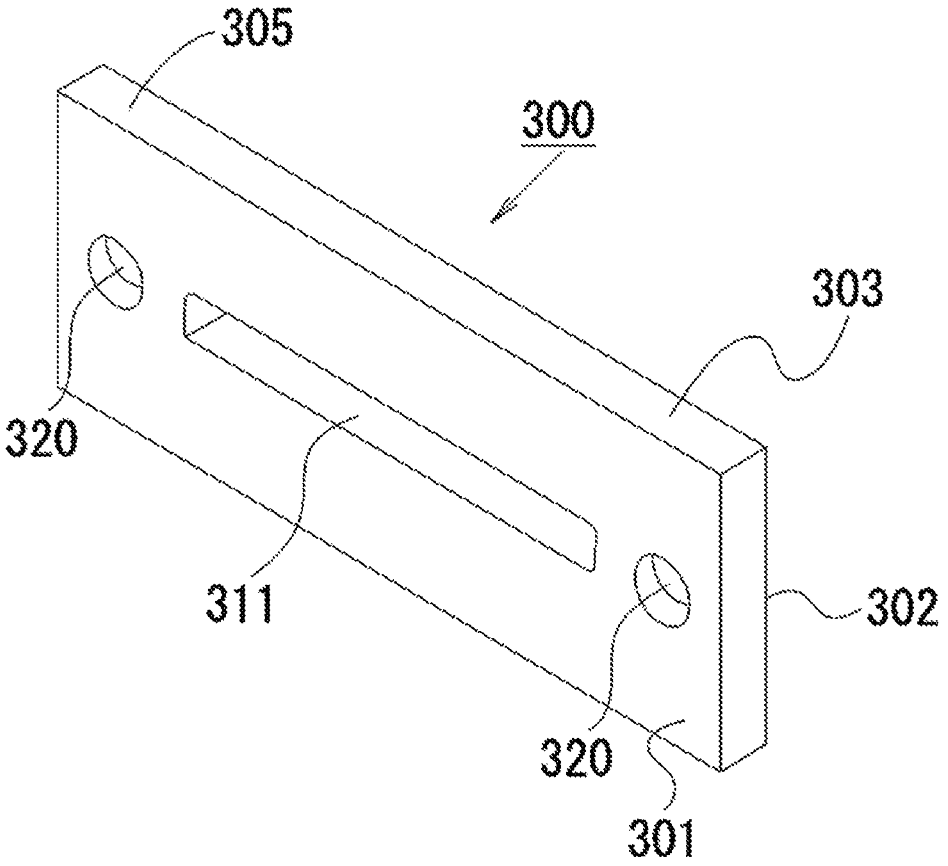

[Fig12]
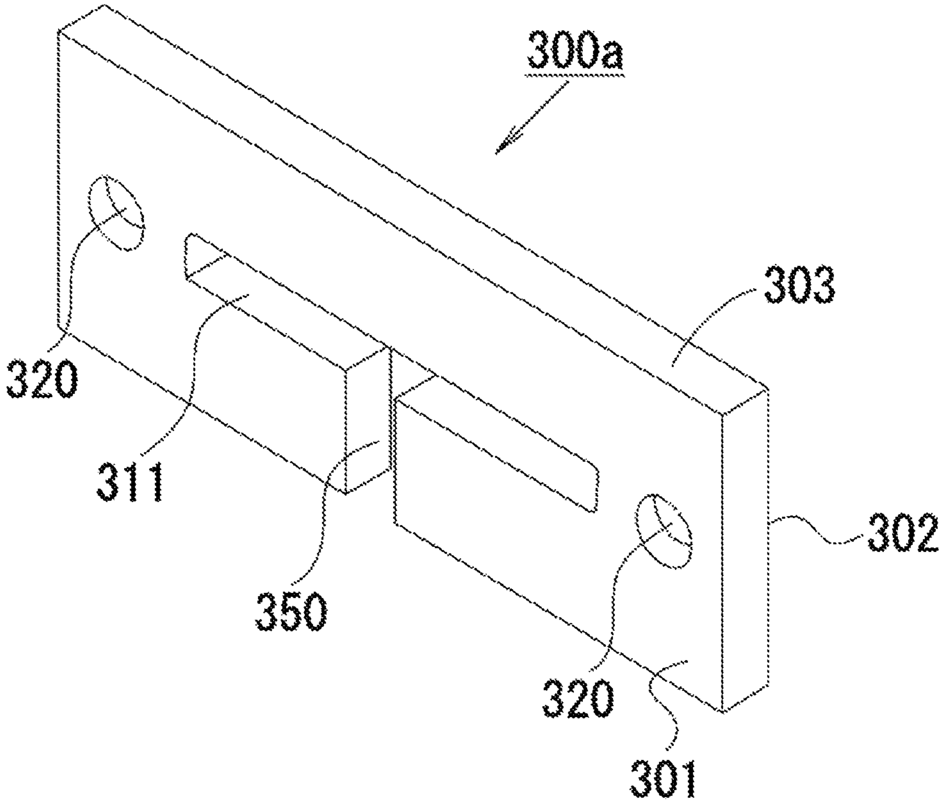

[Fig13]
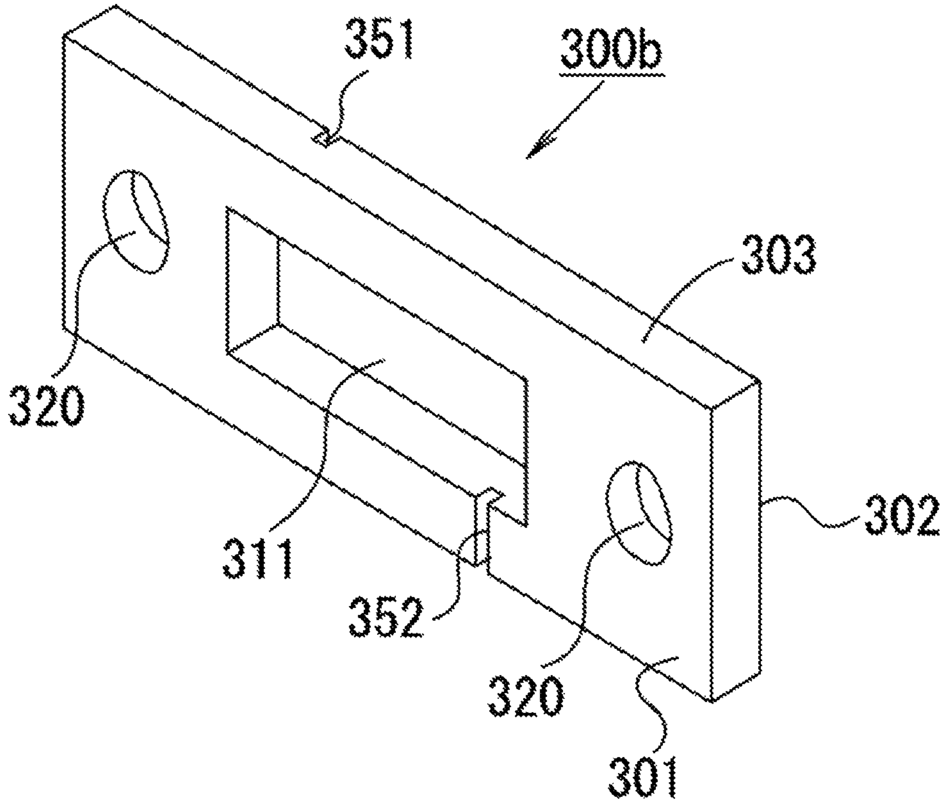

[Fig14]
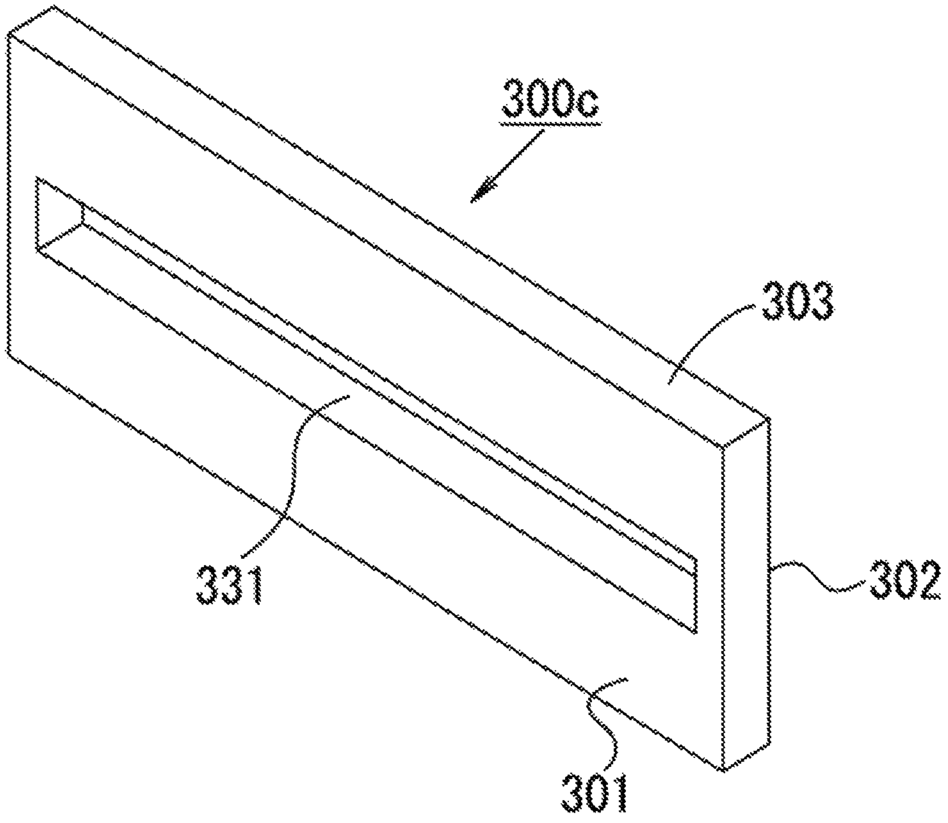

[Fig15]
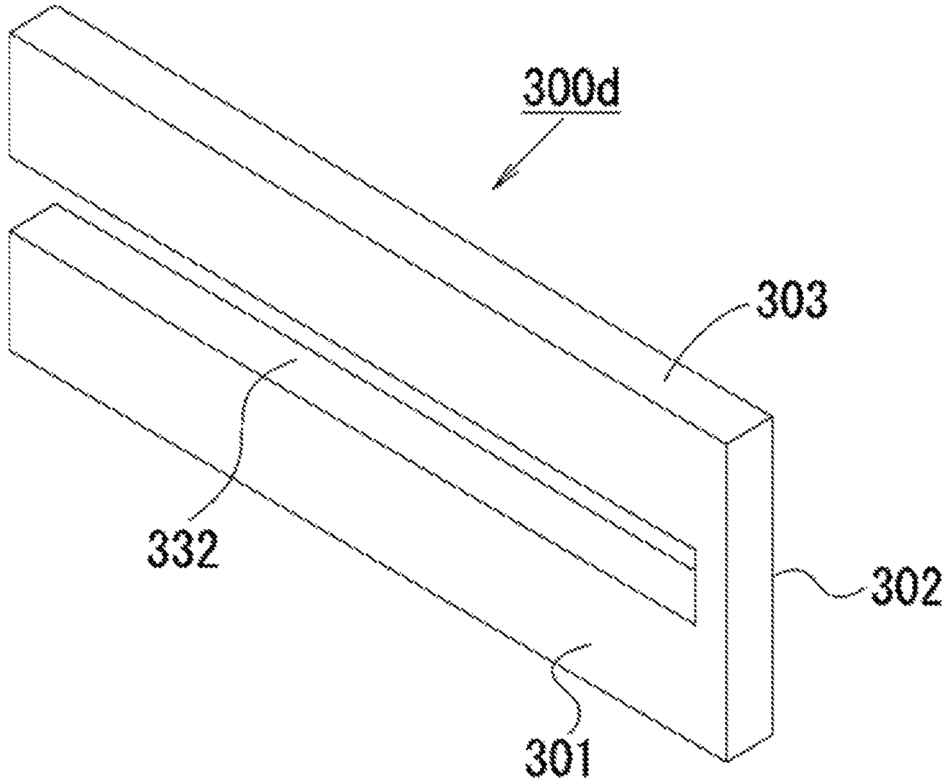

[Fig16]
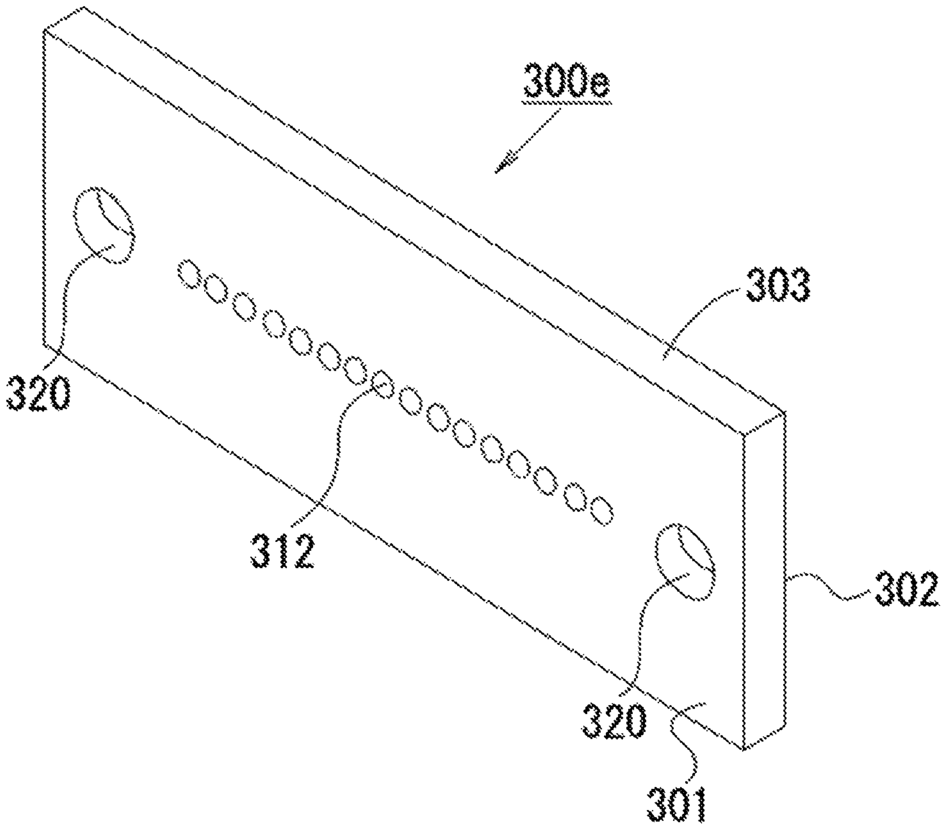

[Fig17]
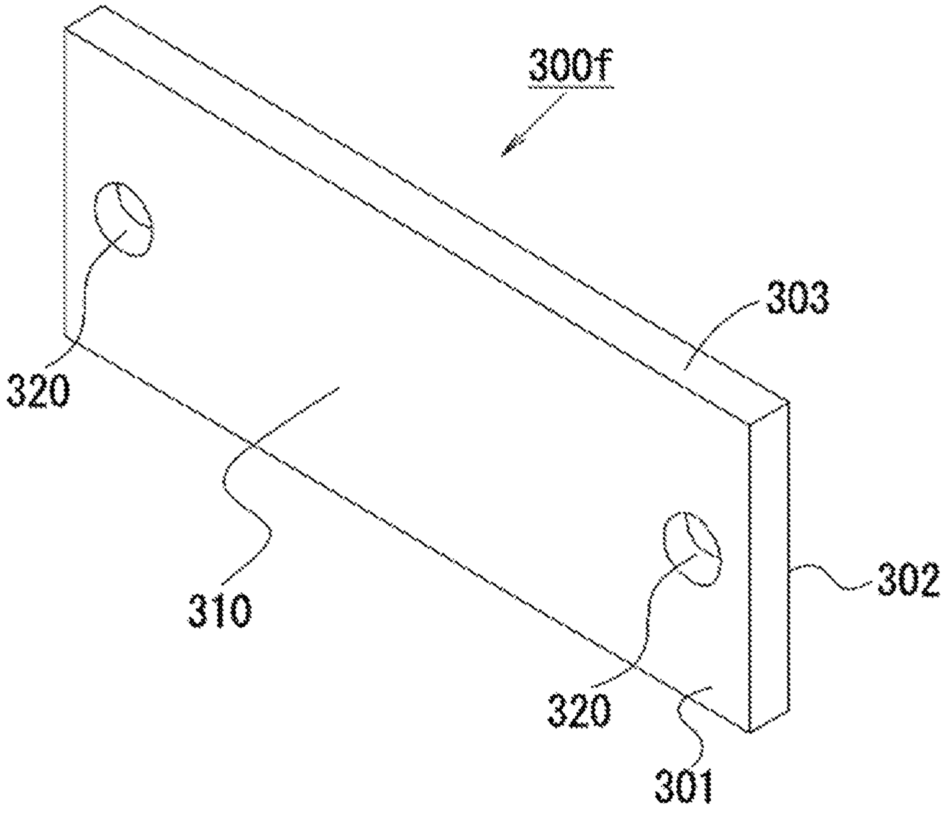

[Fig18]
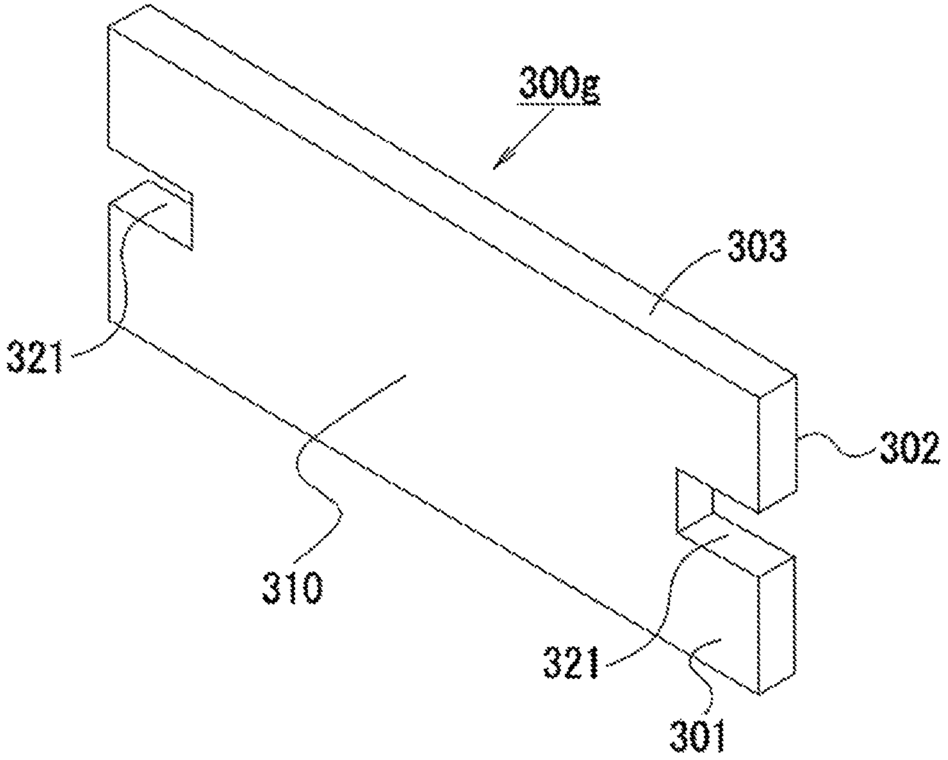

OPTICAL CONNECTOR, OPTICAL CONNECTOR CONNECTING STRUCTURE, AND OPTICAL PACKAGING CIRCUIT

TECHNICAL FIELD

The present invention relates to an optical connector, an optical connector connecting structure, and an optical packaging circuit.

BACKGROUND ART

A structure for interconnecting optical fibers generally uses two ferrule assemblies to be mated, including ferrules, for easy handling of optical fibers and accurate positioning.

Patent Literature 1 (International Publication No. WO 2019/244388) proposes an optical connector using a GRIN lens to increase an optical coupling efficiency and to reduce effects on insertion loss (IL) due to foreign matter, misalignment, or the like.

An optical connecting component proposed in Patent Literature 1 includes a first end and a second end located on an opposite side of the first end. The first end includes a first contact surface that contacts a counterpart connector, a first concave portion, and a first bottom surface. The second end includes a second contact surface that contacts an MT ferrule, a second concave portion, and a second bottom surface. The first bottom surface and the second bottom surface are opposed to an optical fiber holding hole of the MT ferrule. This optical connecting component further includes a guide hole into which a guide pin can be inserted. Resin forming the optical connecting component has a transmittance of 80% or more to 100% or less with respect to light having a wavelength of 1210 nm or more to 1650 nm or less. An optical connector according to one embodiment includes the above-described optical connecting component, a plurality of optical fibers, and an MT ferrule. A GRIN lens is welded and connected to a tip end of each of the plurality of optical fibers (paragraph 0021).

Patent Literature 2 (Japanese Patent Laid-Open No. 2020-122816) discloses a ferrule and an optical connector with which a lens-equipped optical fiber having a configuration in which a GRIN lens is welded and connected to a tip end of the optical fiber can be easily mounted, while an increase in optical connection loss can be suppressed.

The ferrule and the optical connector described in Patent Literature 2 include a main body portion that holds a plurality of lens-equipped optical fibers each having a configuration in which a GRIN lens is welded and connected to a tip end of the optical fiber. The main body portion includes a lower-side member including a plurality of grooves extending along an X-direction and arranged along a Y-direction, and an upper-side member opposed to the plurality of grooves and separated from the lower-side member. Each groove includes a first area that supports the corresponding optical fiber, and a second area that is located between the first area and a front end surface and supports the GRIN lens. The lower-side member further includes a first concave portion provided between the first area and the second area. The first concave portion accommodates a welded portion between the corresponding optical fiber and the GRIN lens.

Patent Literature 3 (Japanese Patent Laid-Open No. 2017-161831) discloses a spacer for optical connector, an optical connector, and an optical connecting structure with which resistance to attachment and detachment of an optical connector can be increased and deterioration in positioning accuracy can be suppressed.

The spacer for optical connector described in Patent Literature 3 includes a plate-shaped main body portion including one end surface opposed to a ferrule end surface, another end surface on an opposite side of the one end surface, and an outer peripheral surface that connects the one end surface with the other end surface. The main body portion includes an opening which is opposed to an optical fiber holding hole and through which light passes from the one end surface to the other end surface of the main body portion, a pair of concave portions formed in at least one of the one end surface and the other end surface, and a guide pin insertion holes which are formed in the pair of concave portions and through which a pair of guide pins penetrate from the one end surface to the other end surface. The guide pin insertion holes are biased to the opening side in the concave portions. The ferrule end surface is provided with a lens array. The lens array includes a plurality of collimating lenses that collimate light output from each optical fiber of the ferrule. Each collimating lens is, for example, a GRIN lens (paragraph 0023).

Patent Literature 4 (Japanese Patent Laid-Open No. 2016-95431) discloses an optical connector coupling system with enhanced reliability.

The optical connector coupling system described in Patent Literature 4 includes a first optical fiber, a first optical connector, a second optical fiber, a second optical connector, a spacer portion, and an adaptor. The first optical connector includes a first ferrule including a first optical interface portion, and a first housing. The second optical connector includes a second ferrule including a second optical interface portion, and a second housing. The spacer portion is disposed on a first optical ferrule. In a state where the first ferrule and the second ferrule are positioned with respect to each other, the first optical fiber is optically coupled to the second optical fiber via the first optical interface portion and the second optical interface portion. The first optical interface portion includes a plurality of Gradient-Index (GRIN) lenses arrayed in parallel to the X-axis direction (paragraph 0042).

CITATION LIST

Patent Literature

Patent Literature 1: International Publication No. WO 2019/244388

Patent Literature 2: Japanese Patent Laid-Open No. 2020-122816

Patent Literature 3: Japanese Patent Laid-Open No. 2017-161831

Patent Literature 4: Japanese Patent Laid-Open No. 2016-95431

SUMMARY OF INVENTION

Technical Problem

In an optical connector connecting structure, each optical fiber is fixed to a ferrule, and an end surface of each optical fiber is positioned to substantially flush with a terminated surface of the ferrule, or is positioned such that the optical fiber end surface slightly protrudes from the terminated surface of the ferrule. The end surface of each optical fiber is generally polished to a predetermined finished quality.

Two ferrule assemblies are positioned and connected with respect to each other via guide pins, and connected optical connectors are fixed with a clamp spring or the like. Thus, when the two ferrule assemblies are mated together, the optical fiber of one of the ferrule assemblies contacts the optical fiber of the other ferrule assembly with a predetermined pressing force.

End surfaces of a pair of optical fibers are in physical contact with each other, which causes optical transmission between the pair of optical fibers. In such an optical connector connecting structure, the optical transmission efficiency between the optical fibers decreases due to various factors. Examples of various factors include irregularities or flaws on the optical fiber end surface, misalignment between the pair of optical fibers, and foreign matter such as dust or fragments between the connected optical fibers.

For example, when the optical connectors are repeatedly attached or detached, in some instances, foreign matter such as dust present on the surface of each guide pin enters the guide pin insertion hole, which may make it difficult to smoothly insert or remove the guide pin. In this case, the positioning accuracy of the optical connectors deteriorates due to a damage to the guide pin insertion hole or the like, which may lead to an increase in coupling loss.

An optical path that passes between optical fibers is smaller than the size of foreign matter such as dust or fragments. Accordingly, the foreign matter is more likely to interfere with optical transmission.

In this case, through the use of a beam connector for enlarging the width of a light beam, the effects due to foreign matter, misalignment, or the like are reduced because the beam is enlarged and accordingly a relative size between beams is increased with respect to foreign matter such as dust.

Accordingly, a technique for using a spherical lens to generate an enlarged beam is proposed to reduce a connection loss due to foreign matter. However, a structure for aligning the spherical lens with the optical fiber is complicated.

In the optical connecting component described in Patent Literature 1, a GRIN lens is welded and connected to a tip end of each of a plurality of optical fibers. In this case, there is no need to use a spherical lens, but welding between each optical fiber and the GRIN lens lowers the productivity. Further, it is difficult to achieve high welding accuracy, which may lead to an increase in connection loss. Furthermore, the outer diameter of a welded portion between each optical fiber and the GRIN lens is larger than the outer diameter of each optical fiber and the GRIN lens.

Therefore, the outer diameter of the welded portion that is larger than the optical fiber insertion hole of the ferrule makes it difficult to insert the welded portion into the insertion hole. On the other hand, if the inner diameter of the insertion hole is set to be larger than the welded portion, a clearance between the insertion hole and the GRIN lens increases, so that misalignment or the like of the GRIN lens is more likely to occur and the optical connection loss increases. Accordingly, the ferrule for accommodating the optical fiber and the GRIN lens needs to be provided with a special structure.

Also, in the ferrule described in Patent Literature 2, the GRIN lens is welded to the end surface of each optical fiber and the ferrule is provided with a concave portion to accommodate the welded portion, which has disadvantages similar to those of Patent Literature 1 described above.

In the optical connector described in Patent Literature 3, each collimating lens is held in a through-hole formed in a lens holding member. This structure makes it difficult to process the lens holding member and to secure the accuracy of operation for holding the lens in an extremely small hole of the lens holding member.

In Patent Literature 3, the collimating lens and the ferrule are simply bonded together. However, the end surface of the optical fiber is exposed from the ferrule, which causes a problem that if an optical signal is caused to pass through the collimating lens from this optical fiber, light reflection or a connection loss occurs at an interface between the optical fiber and adhesive and at an interface between adhesive and the collimating lens.

Also, in the optical connector coupling system described in Patent Literature 4, like in Patent Literature 3, the GRIN lens provided on the first optical interface portion is provided in a through-hole formed in the plate-shaped first optical interface portion. Accordingly, it is difficult to achieve the high accuracy of processing the first optical interface portion and operation of inserting and locating a lens in the lens holding member.

In the optical connector coupling system described in Patent Literature 4, the spacer and the lens array are fixed together with a latch, which causes a problem that a misalignment or the like of components occurs during mating using a clearance between a guide pin and a guide pin hole or a spacer with a latch, which causes variations in optical characteristics.

If the holding hole may be bent during formation, the position of the lens-equipped optical fiber to be held in the holding hole is more likely to be inclined. If the position of the lens-equipped optical fiber is inclined in the vicinity of the front end surface, an angular misalignment of the lens-equipped optical fiber occurs on the front end surface, which may lead to an increase in connection loss between optical connectors.

Furthermore, in the optical connectors described in each Patent Literature described above, high-density packaging of optical fibers requires a large spring force (20 N or more for 16 ch), which causes a problem that it is difficult to achieve both high-density packaging and miniaturization. Therefore, there is a demand for an optical connector to be optically connected with a smaller pressing force.

In recent years, an optical module having a configuration in which an optical element is mounted on a substrate and the optical element and an optical fiber are optically coupled has been developed. Accordingly, an optical packaging circuit having a configuration in which high-speed, high-density optical communication is directly introduced into an electronic substrate (or to the vicinity of the electronic substrate) without involving an electric communication wire has been discussed. When high-speed, large-capacity data is processed, some components on the substrate are heated to high temperature due to an operation. Accordingly, there may be a need to immerse the entire electronic substrate in refrigerant to cool the components.

However, conventional optical communication components are not designed to be immersed, and if an optical circuit contacts liquid such as refrigerant, optical characteristics are more likely to change. This causes a problem that if the optical connector is immersed in refrigerant, the optical connector does not work, or an extremely large loss occurs. The refrigerant may be circulated and may contain foreign matter. If the optical connector is immersed in the refrigerant, the insertion loss may deteriorate due to the effect of foreign matter.

The present invention has been made to address the above-described disadvantages. An object of the present invention is to provide an optical connector, an optical connector connecting structure, and an optical packaging circuit that can reduce the effect on insertion loss due to foreign matter such as foreign particles on a fiber end surface, and due to misalignment in connection.

Another object of the present invention is to provide an optical connector, an optical connector connecting structure, and an optical packaging circuit with high transmission efficiency even when the optical connector, the optical connector connecting structure, and the optical packaging circuit are used as components of an immersion processor.

Still another object of the present invention is to provide an optical connector, an optical connector connecting structure, and an optical packaging circuit with which it is possible to prevent a spring force required for a connector from being increased and to achieve miniaturization in high-density packaging of optical fibers.

Still one more object of the present invention is to provide an optical connector, an optical connector connecting structure, and an optical packaging circuit, which can use a conventional ferrule, have high processing accuracy, and include a lens holding member having a relatively simple structure.

Solution to Problem (1)

An optical connector according to one aspect includes: a first ferrule including a first end surface provided with optical fiber insertion holes into which optical fibers are inserted, and with a pair of guide pin insertion holes into which a pair of guide pins are inserted; a plate-shaped lens holding member bonded to the first end surface of the first ferrule via a refractive index matching adhesive layer; and a spacer provided on an opposite side of the first end surface of the lens holding member. The lens holding member includes a member main body and a GRIN lens provided on the member main body. The spacer includes a light guide portion that allows light transmitted through the GRIN lens to pass. The GRIN lens is optically coupled to the optical fiber.

This configuration eliminates the need for welding the GRIN lens to an end of the optical fiber, and thus the conventional ferrule can be used.

The diameter of a beam is enlarged using the GRIN lens and the beam is transmitted in a space, thereby making it possible to reduce the effects on insertion loss due to foreign matter such as foreign particles on a fiber end surface, and due to misalignment in connection. In particular, even when the optical connector is immersed in refrigerant or the like, the effects of foreign matter contained in the refrigerant can be reduced.

A large spring force (e.g., 20 N or more for 16 ch) is required for high-density packaging of optical fibers, while optical fibers can be held with a spring force of about 3 N in the space transmission. Specifically, in an optical connecting structure of a contactless type, unlike in a physical contact (PC) type, a large number of optical fibers can be optically connected without the need for a large force for optical connection.

In particular, the length of the GRIN lens directly affects a focal length. Accordingly, welding of the surface of the GRIN lens with heat affects the length of the lens, which causes a problem that accurate parallel light beams cannot be obtained, which affects a connection loss. The GRIN lens is formed by providing a concentration distribution to composition of the glass to form a space distribution of the refractive index. This causes a problem that if the lens is welded, stable optical characteristics cannot be obtained due to the effect of the welded lens on the space distribution of the concentration. In the optical connector according to the present invention, the plate-shaped lens holding member is bonded to the first end surface of the first ferrule with the refractive index matching adhesive. Therefore, the optical characteristics can be reliably maintained without performing welding at a connecting surface between the optical fiber and the GRIN lens.

The optical connector may be an MT connector including an MT ferrule, or an MPO connector. The use of the MT ferrule as the first ferrule makes it possible to achieve a miniaturized high-density connecting connector using the commonly used MT ferrule.

(2)

The optical connector according to a second invention is the optical connector according to the invention of one aspect, wherein the light guide portion of the spacer may have a refractive index of 1.2 or more to 1.6 or less.

This configuration makes it possible to minimize the light reflection at an interface between the GRIN lens of the lens holding member and the light guide portion of the spacer. In this case, the light guide portion of the spacer may be formed of resin or glass having a predetermined refractive index, or may be filled with liquid having a predetermined refractive index. A spacer main body may be formed of a transparent resin material, and a refractive index matching material may be coated between the spacer main body and the GRIN lens of the lens holding member.

(3)

The optical connector according to a third invention is the optical connector according to the invention of one aspect or the second invention, wherein the light guide portion may include an opening filled with fluorinated refrigerant.

If the optical connector is immersed in the fluorinated refrigerant, the opening formed in the spacer may be filled with fluorinated refrigerant. As a result, light emitted from the GRIN lens of the lens holding member can be allowed to pass without being reflected on the light guide portion of the spacer. Since refrigerant can be used as a material to be filled in the light guide portion, the optical connector can be suitably used for a system in which a server is immersed.

In the immersion server, the entire electronic substrate of an optical packaging circuit is immersed in a refrigerant tank containing liquid refrigerant, thereby cooling a processor or the like. The liquid refrigerant filled in the immersion server has larger specific heat than air, and can remove heat efficiently by reducing a temperature gradient due to the flow of refrigerant. If fluorinated refrigerant having a low boiling point of 50 degrees Celsius (122 degrees Fahrenheit) is used, the refrigerant is immediately boiled due to heat generated by the processor or the like. In this case, vaporization heat (heat removed from an area where liquid turns into gas) may be used to cool the server.

If the optical connector is immersed in the fluorinated refrigerant, the opening formed in the spacer is filled with the fluorinated refrigerant. As a result, light emitted from the GRIN lens of the lens holding member can be allowed to pass without being reflected on the light guide portion of the spacer. Further, since refrigerant can be used as a material to be filled in the light guide portion, the optical connector can be suitably used for the system in which the server is immersed.

The refrigerant of the immersion processor may preferably have a refrigerant refractive index of 1.2 or more to 1.6 or less. When the optical connector is immersed in the refrigerant tank containing the refrigerant, the refrigerant is filled in the opening of the spacer, thereby making it possible to cool the optical packaging circuit and to optically connect the members without any trouble. If Fluorinert® is used as refrigerant, the refractive index is 1.25 or more to 1.30 or less.

If a spherical lens such as a conventional plastic lens designed to be used in the air is used for an immersion processor, the lens does not work or the focal length varies greatly, which makes it difficult to construct an enlarged beam. On the other hand, like in the present invention, the use of the GRIN lens makes it possible to achieve the enlarged beam in the immersed state without the influence of refrigerant.

An optical connector according to another invention may be immersed in refrigerant for cooling an electronic component.

An optical module having a configuration in which an optical element is mounted on a substrate and the optical element and an optical fiber are optically coupled has recently been vigorously developed. An optical packaging circuit in which high-speed, high-density optical communication is directly introduced to an electronic substrate (or to the vicinity of the electronic substrate) without involving an electric wire has been discussed.

On the other hand, some electronic components on the substrate may be heated to high temperature due to an operation, and thus the entire electronic substrate may be immersed in liquid refrigerant to cool the electronic components. However, if the optical circuit contacts liquid such as refrigerant, the optical characteristics are more likely to change, which causes a problem that the optical connector immersed in refrigerant cannot work in many cases, or an extremely large loss occurs.

Unlike an optical system using the conventional spherical lens, the optical connector according to another invention can achieve a stable enlarged beam also in the immersed state without the influence of refrigerant even when the optical connector is used for an immersion processor, and thus the optical connector with high transmission efficiency can be achieved.

(4)

The optical connector according to a fourth invention is the optical connector according to any one of the one aspect to the third invention, wherein the spacer may include a frame body and the frame body may include two or more flow paths.

The frame body of the spacer may include a flow path for introducing refrigerant to the light guide portion. This flow path makes it possible to smoothly introduce refrigerant to the light guide portion and to efficiently fill the light guide portion with refrigerant, so that the optical characteristics can be stabilized in a short period of time.

The spacer may be provided with one flow path, but is preferably provided with two or more flow paths. The provision of two or more flow paths allows air in the opening of the frame body to efficiently escape to the outside when the optical connector is immersed in refrigerant, thereby making it possible to more efficiently fill the light guide portion with refrigerant.

(5)

The optical connector according to a fifth invention is the optical connector according to any of the one aspect to the fourth invention, wherein the first end surface of the first ferrule and/or the member main body of the lens holding member may be provided with a refractive index matching adhesive resin pool concave portion or convex portion.

With this configuration, the adhesive layer can be formed with a uniform thickness, and optical characteristics can be stabilized. This configuration prevents an excess adhesive from entering the guide pin insertion holes and the like, thereby preventing the occurrence of a malfunction such as a failure to accurately insert guide pins.

(6)

An optical connector connecting structure according to a sixth invention includes: a first ferrule including a first end surface provided with optical fiber insertion holes into which optical fibers are inserted, and with a pair of guide pin insertion holes into which a pair of guide pins are inserted; a plate-shaped lens holding member bonded to the first end surface of the first ferrule via a refractive index matching adhesive layer; a second optical connector disposed to be opposed to the first end surface of the first ferrule; and a spacer including a light guide portion disposed between the lens holding member and the second optical connector, the light guide portion being configured to allow light to pass between the lens holding member and the second optical connector. The lens holding member includes a plate-shaped member main body and GRIN lenses provided on the member main body. Each GRIN lens is aligned with an end surface of the optical fiber inserted into the optical fiber insertion hole. The member main body is formed by joining a lower-side plate member with an upper-side plate member. A joined surface between the lower-side plate member and the upper-side plate member is provided with holding holes for holding the GRIN lenses.

This configuration eliminates the need for welding the GRIN lens to an end of the optical fiber, and thus the conventional ferrule can be used.

The member main body is formed by joining the lower-side plate member with the upper-side plate member, and the joined surface between the lower-side plate member and the upper-side plate member is provided with the holding holes for holding the GRIN lenses. This configuration makes it possible to manufacture the lens holding member including the holding holes easily and accurately.

The GRIN lens is disposed in the holding hole before the lower-side plate member and the upper-side plate member are joined together, and then the lower-side plate member and the upper-side plate member can be joined together. Consequently, the GRIN lens can be held in the holding hole accurately.

The diameter of a beam is enlarged using the GRIN lens and the beam is transmitted in a space, thereby making it possible to reduce the effects on insertion loss (IL) due to foreign matter such as foreign particles on a fiber end surface, and due to misalignment in connection. In particular, even when the optical connector is immersed in refrigerant or the like, the effects of foreign matter contained in the refrigerant can be reduced.

If MPO is employed for high-density packaging of 16 ch or more, the spring force is 20 N or more, while this optical connector can be held with a spring force of about 3 N for the space transmission. Specifically, in an optical connector connecting structure 1 of a contactless type, unlike a physical contact (PC) type, a large number of optical fibers can be simultaneously optically connected without the need for a large force for optical connection.

Further, since the plate-shaped lens holding member is bonded to the first end surface of the first ferrule with the refractive index matching adhesive, the optical characteristics can be reliably maintained on the connecting surface between the optical fiber and the GRIN lens.

The optical connector may be an MT connector including an MT ferrule, or an MPO connector, or may be a dedicated connecting connector. The use of the MT ferrule as the first ferrule makes it possible to achieve a miniaturized high-density connecting connector using the commonly used MT ferrule.

(7)

The optical connector connecting structure according to a seventh invention is the optical connector connecting structure according to the sixth invention, wherein the second optical connector may include a second ferrule including a second end surface. The second end surface of the second ferrule may be provided with optical fiber insertion holes into which an optical fiber is inserted, and with a pair of guide pin insertion holes into which a pair of guide pins are inserted.

This configuration makes it possible to reduce the effects on the insertion loss due to foreign matter such as foreign particles on a fiber end surface, and due to misalignment in connection. Further, the optical connector connecting structure with which it is possible to prevent a spring force required for a connector from being increased and to achieve miniaturization can be obtained in high-density packaging of optical fibers.

(8)

An optical packaging circuit according to an eighth invention includes a refrigerant tank containing refrigerant, and an electronic component. The electronic component is immersed in the refrigerant contained in the refrigerant tank. An optical connector to be connected to the electronic component includes a first ferrule including a first end surface provided with optical fiber insertion holes into which optical fibers are inserted, and with a pair of guide pin insertion holes into which a pair of guide pins are inserted, and a plate-shaped lens holding member bonded to the first end surface of the first ferrule via a refractive index matching adhesive layer. The lens holding member includes a member main body and GRIN lenses provided on the member main body. The GRIN lenses are aligned with end surfaces of the optical fibers inserted into the optical fiber insertion holes.

This configuration makes it possible to reduce the effects on the insertion loss due to foreign matter such as foreign particles on a fiber end surface, and due to misalignment in connection. Furthermore, this optical connector connecting structure makes it possible to prevent a spring force required for a connector from being increased and to achieve miniaturization in high-density packaging of optical fibers.

(9)

The optical packaging circuit according to a ninth invention is the optical packaging circuit according to the eighth invention, wherein the lens holding member includes a first surface corresponding to the first end surface of the first ferrule, and a second surface on an opposite side of the first surface. A spacer is disposed on the second surface of the lens holding member. The spacer includes an opening through which light transmitted through the GRIN lens is allowed to pass. The opening is filled with a medium.

This configuration makes it possible to reduce the effects on the insertion loss due to foreign matter such as foreign particles on a fiber end surface, and due to misalignment in connection. Further, this optical connector connecting structure makes it possible to prevent a spring force required for a connector from being increased and to achieve miniaturization in high-density packaging of optical fibers.

The refractive index of refrigerant of the immersion processor is preferably 1.2 or more to 1.6 or less. Accordingly, when the optical connector is immersed in a water tank containing refrigerant, the opening of the spacer is filled with refrigerant, thereby making it possible to cool the optical connector connecting structure and to optically connect the members without any trouble. If Fluorinert® is used as refrigerant, the refractive index is preferably 1.25 or more to 1.30 or less.

If a spherical lens such as a conventional plastic lens designed to be used in the air is used for an immersion processor, the lens does not work or the focal length varies greatly, which makes it difficult to construct an enlarged beam. On the other hand, like in the present invention, the use of the GRIN lens makes it possible to achieve the enlarged beam in the immersed state without the influence of refrigerant.

BRIEF DESCRIPTION OF DRAWINGS

FIG. 1 is an exploded perspective view of an optical connector connecting structure according to a first embodiment.

FIG. 2 is an exploded plan view of the optical connector connecting structure illustrated in FIG. 1.

FIG. 3 is an exploded front view of the optical connector connecting structure illustrated in FIG. 1.

FIG. 4 is a plan view of the optical connector connecting structure illustrated in FIG. 1.

FIG. 5 illustrates a front view, a plan view, a bottom view, a left side view, and a right side view of a ferrule used in the optical connector connecting structure illustrated in FIG. 1.

FIG. 6 is a schematic explanatory view of a lens holding member according to the first embodiment.

FIG. 7 is a schematic perspective view illustrating the lens holding member according to the first embodiment.

FIG. 8 is a reference sectional view (sectional view taken along A-A' in FIG. 4) illustrating an operation of an optical connector and a light beam.

FIG. 9 is a schematic perspective view illustrating a lens holding member according to another embodiment.

FIG. 10 is a schematic perspective view illustrating a lens holding member according to still another embodiment.

FIG. 11 is a schematic perspective view illustrating a spacer according to the first embodiment.

FIG. 12 is a schematic perspective view illustrating a spacer according to another embodiment.

FIG. 13 is a schematic perspective view illustrating a spacer according to still another embodiment.

FIG. 14 is a schematic perspective view illustrating a spacer according to still one more embodiment.

FIG. 15 is a schematic perspective view illustrating a spacer according to still one more embodiment.

FIG. 16 a schematic perspective view illustrating a spacer according to still one more embodiment.

FIG. 17 is a schematic perspective view illustrating a spacer according to still one more embodiment.

FIG. 18 is a schematic perspective view illustrating a spacer according to still one more embodiment.

DESCRIPTION OF EMBODIMENTS

Embodiments of the present invention will be described below with reference to the drawings. A plurality of embodiments are described as embodiments of the present invention. However, each embodiment may be carried out singly or in combination of one or more embodiments.

In the following description, the same components are denoted by the same reference numerals. The same components have the same names and functions. Accordingly, repeated detailed descriptions thereof are omitted.

First Embodiment (Optical Connector Connecting Structure 1)

FIG. 1 is an exploded perspective view illustrating the optical connector connecting structure 1 according to one embodiment. FIG. 2 is an exploded plan view illustrating the optical connector connecting structure 1. FIG. 3 is an exploded front view of the optical connector connecting structure 1.

As illustrated in FIGS. 1 to 3 and FIG. 6, the optical connector connecting structure 1 according to the present embodiment includes a first ferrule 110, a plate-shaped lens holding member 200 that is bonded to a first end surface 112 of the first ferrule 110 via a refractive index matching adhesive layer (not illustrated), a second optical connector 20 disposed to be opposed to the first end surface 112 of the first ferrule 110, and a spacer 300 including a light guide portion 310 that is disposed between the lens holding member 200 and the second optical connector 20 and is configured to allow light to pass between the lens holding member 200 and the second optical connector 20.

As illustrated in FIGS. 1 to 5, a first optical connector 10 according to the present embodiment includes the first ferrule 110 including the first end surface 112 provided with optical fiber insertion holes 114 into which optical fibers 30 are inserted, and with a pair of guide pin insertion holes 116 into which a pair of guide pins 40 are inserted, and the plate-shaped lens holding member 200 bonded to the first end surface 112 of the first ferrule 110 via the refractive index matching adhesive layer.

The second optical connector 20 can include a second ferrule 120, and the plate-shaped lens holding member 200 bonded to a second end surface 122 of the second ferrule 120 via the refractive index matching adhesive layer. In this case, the optical connector connecting structure 1 includes the first ferrule 110 and the second ferrule 120, which are connected to each other, the first lens holding member 200 disposed between the first and second ferrules 110 and 120, a second lens holding member 200', and the spacer 300.

(Refractive Index Matching Adhesive Layer)

A refractive index matching adhesive used for the refractive index matching adhesive layer preferably has a refractive index after curing of 1.4 or more to 1.5 or less, and more preferably, 1.45 or more to 1.48 or less. With this configuration, a connection loss between the optical fiber 30 and each GRIN lens 250 can be minimized and the generation of reflected light can be minimized.

Acrylic or epoxy optical adhesive can be used as the refractive index matching adhesive for the refractive index matching adhesive layer. The refractive index matching adhesive may be a thermosetting adhesive or a UV-curable adhesive. If an opaque member is present, it is preferable to use a thermosetting adhesive. If a heat-sensitive member is present, it is preferable to use a UV-curable adhesive. With this configuration, the connection loss between the optical fiber 30 and the GRIN lens 250 can be minimized and the generation of reflected light can be minimized.

(Ferrules)

The first and second ferrules 110 and 120 each have a substantially rectangular parallelepiped appearance, and is formed by, for example, resin. The first and second ferrules 110 and 120 may be formed of formable resin such as polyphenylene sulfide or liquid crystal polymer (LCP). The resin may contain additives such as silica ($S_iO_2$) to increase the strength and stability of the resin. The first and second ferrules 110 and 120 may be formed of an inorganic material such as ceramics.

The first and second ferrules 110 and 120 respectively include the first end surface 112 and the second end surface 112, which are flat surfaces provided on one end in a connecting direction, and back end surfaces 113 and 123, which are provided on the other end. The first and second ferrules 110 and 120 include a pair of side surfaces extending along the connecting direction, a bottom surface, and a top surface.

The first end surface 112 of the first ferrule 110 and the second end surface 112 of the second ferrule 120 are disposed to be opposed to each other.

The first end surface 112 and the second end surface 122 are each provided with a pair of guide pin insertion holes (guide holes) 116 arranged in a direction crossing a cross section along an optical axis of each optical fiber 30. The pair of guide pins 40, 40 are inserted into the pair of guide pin insertion holes 116, respectively. In other words, relative positions of the first ferrule 110 and the second ferrule 120 are determined by the pair of guide pins 40, 40.

The first end surface 112 is provided with the plurality of optical fiber insertion holes 114 into which the optical fibers 30 are inserted. The back end surface 113 of each of the first and second ferrules 110 and 120 is provided with an introduction hole 117 that receives a ribbon fiber formed of the plurality of optical fibers 30 (FIG. 5(*d*)).

The plurality of optical fiber insertion holes 114 are formed to penetrate from the first end surface 112 to the introduction holes 117. The optical fibers 30 are inserted and held in the optical fiber insertion holes 114, respectively.

Each optical fiber 30 extends along the connecting direction and are aligned in a row in a horizontal direction crossing the connecting direction. The number of optical fiber insertion holes 114 can be determined depending on the intended use. Only one optical fiber insertion hole 114 (in this case, a single-core ferrule) may be provided, or a plurality of optical fiber insertion holes 114 (in this case, a multi-fiber ferrule) may be provided. The present embodiment illustrates an example of a multi-fiber MT ferrule, such as 12-core, or 16-core MT ferrule, in which the optical fibers 30 are aligned in a row.

Each optical fiber 30 according to the present embodiment includes a bare optical fiber and a resin coating that covers the bare optical fiber. The resin coating from a middle portion to a tip end in the connecting direction is removed to thereby expose the bare optical fiber.

The bare optical fibers are held in the optical fiber insertion holes 114, respectively. The tip end of each bare optical fiber is exposed from the first end surface 112. For example, the bare optical fiber flushes with the first end surface 112, or slightly protrudes from the first end surface. In the present invention, the bare optical fiber is also simply referred to as the optical fiber 30.

In the present embodiment, each optical fiber insertion hole 114 has an inner diameter of 125.5 μm or more to 127.5 μm or less, and a multi-mode fiber having an outer diameter of 125 μm is used as a bare optical fiber. In this case, the core diameter of each optical fiber 30 is 50 μm.

The present embodiment illustrates a case where a multi-mode optical fiber having a cladding diameter of 125 μm is used to transmit an optical signal having a wavelength of 1300 nm. However, each optical fiber 30 may have a cladding diameter of 80 μm or the like, and may be a multi-mode or single-mode fiber. The wavelength of the optical signal can also be appropriately selected depending on the intended use. For example, a multi-mode fiber (thin cladding fiber) having a core diameter of 50 μm and a cladding diameter of 80 μm can be used, or a single-mode fiber having a core diameter of 10 μm and a cladding diameter of 80 μm or 125 μm can be used. In this case, the inner diameter of each optical fiber insertion hole 114, the design of the GRIN lens 250, physical properties of refrigerant, and the like can be appropriately selected depending on the selected optical fiber or optical signal.

(Lens Holding Member 200)

The first end surface 112 of the first ferrule 110 and the second end surface 122 of the second ferrule 120 are provided with plate-shaped lens holding members 200, 200', respectively.

The lens holding member 200 includes a plurality of GRIN lenses 250 that diffuse and collimate light output from each optical fiber 30 of the first ferrule 110. The GRIN lenses 250 are respectively held in holding holes 220 that are formed in the lens holding member 200. The lens holding member 200' disposed on the second ferrule 120 includes a plurality of GRIN lenses 250 that collect light beams that have transmitted the light guide portion 310 of the spacer 300. Each GRIN lens 250 is held in the corresponding holding hole 220 formed in the lens holding member 200'.

An array pitch of the GRIN lenses 250 is set to be equal to an array pitch of the optical fibers 30 held in the first and second ferrules 110 and 120. The GRIN lenses 250 are arrayed so as to correspond to the optical fibers 30, respectively, and the GRIN lenses 250 and the optical fibers 30 are optically connected.

Each GRIN lens 250 has a cylindrical shape and is disposed such that the central axis of the cylindrical shape matches the central axis of the corresponding optical fiber 30. Each optical fiber 30 according to the present embodiment is a multi-mode fiber having an outer diameter of 125 μm and a core diameter of 50 μm. In this case, the outer diameter of each GRIN lens 250 is preferably 130 μm or more to 300 μm or less, more preferably, 150 μm or more to 250 μm or less, and much more preferably, 180 μm or more to 220 μm or less.

With this configuration, the multi-mode beam having a diameter of 50 μm is enlarged to a diameter of 100 μm to 120 μm and is collimated and transmitted. This makes it possible to reduce insertion loss due to foreign matter or the like on the connecting portion. The beam on which a communication signal is superimposed can be collimated by the GRIN lens 250 and a signal can be transmitted in a contactless manner between the first and second ferrules 110 and 120. Consequently, the optical connector can be miniaturized without the need for providing a strong physical contact force to connect high-density optical fibers.

Unlike in an optical system using a conventional spherical lens, the stable enlarged beam can be achieved in the immersed state without the influence of refrigerant also in the case of using the optical connector for an immersion processor, and the optical connector with high transmission efficiency can be achieved.

As illustrated in FIG. 6 and FIG. 7, the lens holding member 200 is formed into a plate shape including a first surface 202 opposed to the first end surface 112, a second surface 204 located on the opposite side of the first surface 202, and an outer peripheral surface 206 that connects the first surface 202 and the second surface 204.

Both ends of the lens holding member 200 are provided with guide holes 224 into which the guide pins 40 that penetrate from the first surface 202 to the second surface 204 are inserted. The interval between the pair of guide holes 224, 224 that are formed in the lens holding member 200 is set to be equal to the interval between the pair of guide pin insertion holes 116, 116 that are formed in the end surface of the first ferrule 110.

The lens holding member 200 according to the present embodiment will be described in detail below.

The lens holding member 200 includes a horizontally-long plate-shaped member main body 210 and the GRIN lenses 250 provided on the member main body 210.

The member main body 210 has a configuration in which a lower-side plate member 212 elongated in a lateral direction (horizontal direction) and an upper-side plate member 214 elongated in the lateral direction (horizontal direction) are vertically joined together. To join the lower-side plate member 212 and the upper-side plate member 214, the lower-side plate member 212 and the upper-side plate member 214 may be bonded with adhesive.

The holding holes 220 for holding the GRIN lenses 250 are formed between an upper surface (joint surface) of the lower-side plate member 212 and a lower surface (joint surface) of the upper-side plate member 214. Specifically, concave portions 216 are formed in the joint surface of the lower-side plate member 212, and the joint surface of the upper-side plate member 214 is joined with the lower-side plate member 212, thereby forming the holding holes 220 between the concave portion 216 and the joint surface of the upper-side plate member 214.

A sectional shape of each concave portion 216 may be a U-shape, a V-shape, a semicircular shape, or the like. In the present embodiment, as illustrated in FIG. 6, each concave portion 216 is formed with an inverted triangular cross section. The joint surface (lower surface) of the upper-side plate member 214 is formed as a flat surface. Accordingly, if the joint surface (upper surface) of the lower-side plate member 212 is joined with the joint surface (lower surface) of the upper-side plate member 214, the holding holes 220 each having an inverted triangular cross section are formed between the joint surfaces. In the embodiment illustrated in FIGS. 6 and 7, the plurality of holding holes 220 each having an inverted triangular shape are formed continuously (in a saw-tooth shape) along a longitudinal direction of the member main body 210.

The lens holding member 200 can be formed of an inorganic material such as quartz, glass, or ceramics, resin, or the like that can be processed by precision work. Each concave portion 216 having an inverted triangular cross section and each holding hole 220 having an inverted triangular cross section can be accurately formed, for example, by cutting the member main body 210. The lens holding member 200 may be formed of transparent resin. With excellent processing accuracy, each GRIN lens 250 can be disposed in the corresponding holding hole 220 as designed, and can be aligned (optically coupled) with the end surface of the corresponding optical fiber 30.

To hold each GRIN lens 250 in the corresponding holding hole 220 of the lens holding member 200, the GRIN lens 250 is disposed in the corresponding concave portion 216 of the lower-side plate member 212. After that, the joint surface of the upper-side plate member 214 may be joined with the joint surface of the lower-side plate member 212. The GRIN lens 250 can be bonded and fixed to the corresponding holding hole 220 with adhesive. For example, the GRIN lens 250 may be disposed in the corresponding concave portion 216 and then the concave portion 216 may be filled with adhesive to thereby fix the GRIN lens 250 to the corresponding concave portion 216, or the GRIN lens 250 may be held in the corresponding holding hole 220 and then the holding hole 220 may be filled with adhesive for bonding.

Lower-side concave portions 218 formed at both ends of the lower-side plate member 212 may have a semicircular, U-shape, or V-shape section. Upper-side concave portions 222 formed at both ends of the upper-side plate member 214 may have a semicircular shape, U-shape, V-shape section.

In the present embodiment, each lower-side concave portion 218 formed in the lower-side plate member 212 has an inverted triangular cross section, and each upper-side concave portion 222 has a triangular cross section. Accordingly, if the joint surface of the upper-side plate member 214 is joined with the joint surface (upper surface) of the lower-side plate member 212, the guide holes (guide pin insertion holes) 224 each having a rhombic cross section are formed between the joint surfaces.

The concave portions each having an inverted triangular cross section and the holding holes 220 each having an inverted triangular cross section can be accurately formed by cutting the lens holding member 200.

In the case of bonding the joint surface of the lower-side plate member 212 with the joint surface of the upper-side plate member 214 with adhesive, adhesive such as a thermosetting epoxy resin-based adhesive or a cyanoacrylate-based adhesive is used. Specifically, acrylic adhesive, epoxy adhesive, vinyl adhesive, silicone adhesive, rubber adhesive, urethane adhesive, methacrylic adhesive, nylon adhesive, bisphenol adhesive, diol adhesive, polyimide adhesive, fluorinated epoxy adhesive, or fluorinated acrylic adhesive can be used. In particular, silicone adhesive and acrylic adhesive are preferably used.

The lens holding member 200 may be provided with an adhesive pool portion to prevent the guide pins 40 from being bonded to the guide pin insertion holes 116 with the adhesive used to join the lower-side plate member 212 and the upper-side plate member 214 and the adhesive used to fix the GRIN lenses 250 to the lens holding member 200. For example, the adhesive pool portion may be provided between the guide pin insertion holes 116 and the holding holes 220.

In the lens holding member 200 having a configuration as described above, each GRIN lens 250 held in the lens holding member 200 is aligned with the end surface of the corresponding optical fiber 30 inserted into the optical fiber insertion hole 114 and is optically coupled.

Accordingly, light output from the optical fiber 30 passes through the GRIN lens 250. The number of GRIN lenses 250 is not limited to one, and a plurality of GRIN lenses 250 may be provided. A plurality of GRIN lenses 250 may be provided at regular intervals along the longitudinal direction (lateral direction) of the lens holding member 200.

In the optical connector according to one embodiment, the member main body may be formed by joining the lower-side plate member with the upper-side plate member, and the joined surface between the lower-side plate member and the upper-side plate member may be provided with holding holes for holding the GRIN lenses, respectively.

The member main body is formed by joining the lower-side plate member with the upper-side plate member, and the joint surface between the lower-side plate member and the upper-side plate member is provided with the holding holes for holding the GRIN lenses, respectively. This configuration makes it possible to manufacture the lens holding member including the holding holes easily and accurately.

Each GRIN lens can be disposed in the corresponding holding hole before the lower-side plate member and the upper-side plate member are joined together, and then the lower-side plate member and the upper-side plate member can be joined together. Consequently, the GRIN lens can be held in the corresponding holding hole accurately.

In the optical connector according to one embodiment, the joint surface of the lower-side plate member may be provided with concave portions, and the joint surface of the upper-side plate member may be joined with the joint surface of the lower-side plate member to thereby form holding holes between the concave portions and the joint surface of the upper-side plate member.

To hold each GRIN lens in the corresponding holding hole of the lens holding member, the GRIN lens may be disposed in the corresponding concave portion formed in the joint surface of the lower-side plate member. After that, the joint surface of the upper-side plate member may be joined with the joint surface of the lower-side plate member. Accordingly, the lens holding member can be manufactured relatively easily. In addition, the holding hole processing accuracy can be increased and the GRIN lens can be held in the lens holding member accurately.

In the optical connector according to one embodiment, lower-side concave portions for guide holes may be formed at both ends of the joint surface of the lower-side plate member, upper-side concave portions for guide holes may be formed at both ends of the joint surface of the upper-side plate member, and guide holes may be formed between the lower-side concave portions and the upper-side concave portions at both ends of the lens holding member by joining the joint surface of the lower-side plate member with the joint surface of the upper-side plate member.

With this configuration, the lens holding member including the guide holes (guide pin insertion holes) can be created accurately and relatively easily.

The lens holding member can be formed of an inorganic material such as quartz, glass, or ceramics, resin, or the like that can be processed by precision work. Each concave portion having an inverted triangular cross section and each holding hole having an inverted triangular cross section can be accurately formed by processing the member main body.

In the optical connector according to one embodiment, the lens holding member may include the lower-side concave portions each having an inverted triangular cross section, the upper-side concave portions each having a triangular sectional shape, and the guide holes each having a rhombic cross section.

The lens holding member can be formed of an inorganic material, such as quartz, glass, or ceramics, resin, or the like that can be processed by precision work. Each concave portion having an inverted triangular cross section and each guide hole for guide pin insertion hole having an inverted triangular cross section can be accurately formed by processing the member main body.

In the optical connector according to one embodiment, the joint surface of the lower-side plate member and the joint surface of the upper-side plate member may be bonded with adhesive.

The joint surface of the lower-side plate member and the joint surface of the upper-side plate member are bonded with adhesive, thereby making it possible to easily manufacture the lens holding member.

(Lens Holding Member 200*a* of Another Embodiment)

In a lens holding member 200*a* according to another embodiment, the holding holes 220 for holding the GRIN lenses 250, respectively, have a circular shape (cylindrical shape), and are integrally formed with the lower-side plate member 212 and the upper-side plate member 214 without being separated therefrom. FIG. 9 is a schematic perspective view illustrating the lens holding member 200*a* according to another embodiment. The inner diameter of each holding hole 220 of the lens holding member 200*a* according to another embodiment is preferably 1 μm to 3 μm larger than the diameter of each GRIN lens 250.

In the case of fixing each GRIN lens 250 to the lens holding member 200*a* according to another embodiment, the GRIN lens 250 is coated with adhesive and is then inserted into the corresponding holding hole 220. When the GRIN lens 250 is inserted into the holding hole 220, a misalignment may occur between the central position of the cross section of the GRIN lens 250 and the central position of the cross section of the holding hole 220. However, a curing shrinkage stress of adhesive acts and the GRIN lens 250 is held at the center of the cross section of the holding hole 220 during curing. Accordingly, the lens holding member 200*a* with high assembly accuracy can be obtained.

(GRIN Lens 250)

Each GRIN lens 250 is configured to have a refractive index that gradually changes toward the outer periphery from the central portion thereof (including a refractive index distribution). Each GRIN lens 250 held in the lens holding member 200 is configured to enlarge a light beam output from the corresponding optical fiber 30. The GRIN lens 250 is configured to collimate diverging rays output from the optical fiber 30 and to output parallel rays in an intended direction. The GRIN lens 250 includes flat optical surfaces on both surfaces, respectively, which facilitates mounting of the lens holding member 200 of the GRIN lens 250 into the holding hole 220.

As the GRIN lens, the GRIN lens in which a refractive index distribution is formed by an "ion exchange" process of immersing a base material rod in high-temperature molten salt can be used. The rod obtained after the ion exchange process is cut to a length depending on the intended use and the both ends of the rod are polished.

The length of the GRIN lens 250 is preferably 0.5 mm or more to 1.5 mm or less, and more preferably, 0.8 mm or more to 1.2 mm or less. In this case, the sizes of the lens holding member 200 and the holding hole 220 can be reduced.

Each GRIN lens 250 of the lens holding member 200 disposed on the second ferrule 120 is configured to collect light beams corresponding to parallel rays that have passed through the light guide portion of the spacer and are incident on the GRIN lens 250, and to focus the light beams on the optical fiber 30.

(Spacer 300)

As illustrated in FIGS. 1 to 3 and FIG. 11, the spacer 300 is held by a pair of lens holding members 200 and 200' between the first end surface 112 of the first ferrule 110 and the second end surface 122 of the second ferrule 120. Accordingly, the spacer 300 can control the distance between the first end surface 112 of the first ferrule 110 and the second end surface 122 of the second ferrule 120 to be constant. The spacer 300 controls the distance between the pair of lens holding members 200 and 200', thereby controlling the distance between a pair of ferrule end surfaces. The spacer 300 may be bonded to at least one of the lens holding members 200, or may be joined by welding (laser welding or the like). In the case of bonding the spacer 300 to the lens holding member 200, an MPO connector is preferably used as the connector during bonding.

As illustrated in FIG. 11, the spacer 300 includes a spacer main body 305 including one end surface 301, another end surface 302 on the opposite side of the one end surface 301, and an outer peripheral surface 303 that connects the one end surface 301 and the other end surface 302. The one end surface 301 of the spacer 300 is opposed to the first end surface 112 of the first ferrule 110, and the other end surface 302 of the spacer 300 is opposed to the second end surface 122 of the second ferrule 120.

The spacer main body 305 may include an opening 311 functioning as the light guide portion 310 that allows light to pass between the one end surface 301 and the other end surface 302. In the present embodiment, as illustrated in FIG. 11, the spacer 300 is provided with a pair of guide holes 320, 320 for inserting the guide pins, and with the opening 311 through which light is allowed to pass. An optical path formed between the pair of lens holding members 200 and 200' passes through the opening 311 (light guide portion 310). The inside of the opening 311 may be filled with gas or liquid having a predetermined refractive index. In a case where the optical connector is immersed, the opening may be filled with a predetermined refrigerant. The inside of the opening 311 may be provided with transparent resin or glass having a predetermined refractive index.

If the spacer main body 305 includes the opening 311, the spacer main body 305 is formed in a frame shape. If the spacer 300 includes no opening, the spacer main body 305 may be formed of a transparent plate-like member (e.g., a sheet) that is transparent with respect to the wavelength of light to pass therethrough.

The both ends of the spacer 300 are provided with the pair of guide holes 320, 320 into which the guide pins 40 that penetrate from the one end surface 301 to the other end surface 302 are inserted.

The interval between the pair of guide holes 320, 320 is set to be equal to the interval between the pair of guide pin insertion holes 116, 116 and the pair of guide holes 224, 224.

In the present embodiment, the one end surface 301 of the spacer 300 is bonded to the lens holding member 200 disposed on the first end surface 112 of the first ferrule 110. The other end surface 302 of the spacer 300 contacts the lens holding member 200 disposed on the second end surface 122 of the second ferrule 120 during connection with the second ferrule 120.

In this case, the first ferrule 110, the lens holding member 200 bonded to the first ferrule 110, and the spacer 300 constitute the optical connector (first optical connector) 10.

The pair of guide pins 40 are inserted into the pair of guide pin insertion holes 116, the pair of guide hole 224 in the first ferrule 110, and the pair of guide holes 320 of the spacer 300, thereby fixing the positions of the first optical connector 10, the lens holding member 200, and the spacer 300.

In the present embodiment, the ferrule and the optical connector for optically coupling the multi-mode optical fibers 30 are described. The present invention can also be applied to a ferrule and an optical connector for optically coupling single-mode optical fibers 30.

(Operation of Optical Connector)

Next, optical coupling between the optical fiber 30 fixed to the first ferrule 110 of the first optical connector 10 and the optical fiber 30 fixed to the second optical connector 20 will be described below.

The light beam that has propagated in the optical fiber 30 fixed to the first ferrule 110 and is incident on each GRIN lens 250 of the lens holding member 200 is enlarged by the GRIN lens 250, and is then output toward the light guide portion 310 (opening 311) of the spacer 300. As illustrated in FIG. 8, the GRIN lens 250 collimates diverging rays from the optical fiber 30 and converts the diverging rays into substantially parallel light beams.

When the light beam enlarged by the GRIN lens 250 propagates in the light guide portion 310 and enters the GRIN lens 250 of the second optical connector 20, the light beam is collected on the end surface of the optical fiber 30 fixed to the second ferrule 120 by the GRIN lens 250 and propagates in the optical fiber 30.

Thus, the optical fiber 30 fixed to the first ferrule 110 and the optical fiber 30 fixed to the second ferrule 120 are optically coupled via the lens holding member 200 and the spacer 300.

In the optical connector connecting structure 1 according to the present embodiment, the light beam is enlarged between the first optical connector 10 and the second optical connector 20. Accordingly, in the optical connector connecting structure 1 according to the present embodiment, light is transferred in the formed of an enlarged light beam, thereby preventing a connection loss caused due to an axial misalignment between the first optical connector 10 and the second optical connector 20 in a plane (XY-plane) orthogonal to a light coupling direction (Z-axis direction) or due to the presence of foreign matter. Accordingly, the connection loss of optical characteristics due to an axial misalignment, foreign matter on an optical fiber end surface during connection, and the like can be reduced.

The second optical connector 20 may include the second ferrule 120 including the second end surface 122, and the second end surface 122 of the second ferrule 120 may be provided with optical fiber insertion holes into which the optical fibers 30 are inserted and a pair of guide pin insertion holes into which the pair of guide pins 40 are inserted.

With this configuration, the pair of guide pins 40 can accurately position the pair of guide pin insertion holes 116 in the first ferrule 110, the pair of guide hole 224 of the lens holding member 200, the pair of guide holes 320 of the spacer 300, the pair of guide holes 224 of the lens holding member 200', and the optical fiber insertion holes of the second ferrule 120. As a result, the optical fiber 30 of the first optical connector 10 and the optical fiber 30 of the second optical connector 20 are optically connected to thereby form the optical connector connecting structure 1.

An optical packaging circuit according to the present embodiment includes a refrigerant tank containing refrigerant, and an electronic component, and the electronic component is immersed in the refrigerant tank. In this case, the refractive index of refrigerant is preferably 1.2 or more to 1.6 or less. By setting the refractive index in the above-described range, the effect of light reflection at the interface between the GRIN lens 250 and the refrigerant can be minimized, thereby minimizing the connection loss.

If Fluorinert® is used as refrigerant, the refractive index is preferably 1.25 or more to 1.30 or less, and more preferably, 1.26 or more to 1.28 or less. Thus, a chemically stable insulator can be obtained and can be used for various cooling purposes. In addition, insulators having various boiling points can be selected, and thus can be used for a single-phase use in liquid and for a two-phase use to be boiled and cooled by latent heat of evaporation.

The optical packaging circuits refer to, but are not limited to, electronic devices, such as super computers and data centers, that require ultra-high-performance operation and stable operation, and that generate a large amount of heat from themselves.

Examples of electronic components include a processor, a memory, and a server, and these electronic components include an optical connector.

As the optical connector used for the optical packaging circuit, the optical connector used in the above-described embodiments can be used.

Specifically, the optical connector includes the first ferrule 110 including the first end surface 112 provided with the optical fiber insertion holes 114 into which the optical fibers are inserted, and the pair of guide pin insertion holes 116 into which the pair of guide pins 40 are inserted, and the lens holding member 200 bonded to the first end surface 112 of the first ferrule 110 via a refractive index matching adhesive layer. The lens holding member 200 includes the member main body 210 and the GRIN lenses 250 provided on the member main body 210. Each GRIN lens 250 is aligned with the end surface of each optical fiber inserted into the corresponding optical fiber insertion hole 114.

The lens holding member 200 includes the first surface 202 corresponding to the first end surface 112 of the first ferrule 110, and the second surface 204 on the opposite side of the first surface 202. The spacer 300 is disposed on the second surface 204 of the lens holding member 200. The spacer 300 includes the opening 311 (light guide portion 310) through which light that has passed through the GRIN lens 250 is allowed to pass, and the opening 311 (light guide portion 310) is filled with refrigerant.

The optical packaging circuit according to the present embodiment is an immersion cooling system using a fluorocarbon-based coolant.

(Assembly Method)

Next, a process of locating the lens holding member 200 on the first end surface 112 of the first ferrule 110 will be described.

The lens holding member 200 is temporarily placed at a position slightly apart from the first end surface 112 in a state where each of a pair of jig guide pins is inserted into the corresponding guide pin insertion hole 116 of the first ferrule 110 and the corresponding guide hole 224 of the lens holding member 200. After that, a refractive index matching adhesive is supplied to a space between the back surface of the lens holding member 200 and the first end surface 112, and then the lens holding member 200 and the first end surface 112 are brought into close contact with each other to thereby fix the lens holding member 200 to the first ferrule 110 via the refractive index matching adhesive. Lastly, each of the pair of jig guide pins is drawn out from the corresponding guide pin insertion hole 116 and the corresponding guide hole 224.

Thus, each GRIN lens 250 is positioned with respect to the end surface of the corresponding optical fiber 30, thereby allowing each GRIN lens 250 to be optically coupled to the corresponding optical fiber 30. Each guide pin insertion hole 116 is positioned with respect to the corresponding guide hole 224, thereby allowing each guide pin insertion hole 116 to communicate with the corresponding guide hole 224.

(Lens Holding Member **200*b*** of Another Embodiment)

FIG. 10 illustrates a lens holding member **200*b* provided with a pair of resin pool concave portions 280 formed on the first end surface 112 side of the first ferrule 110 of the lens holding member 200*b*. Each resin pool concave portion 280 is formed of a recessed groove running in the vertical direction between the holding holes 220 and the guide holes 224. The refractive index matching adhesive is filled in a space between the pair of resin pool concave portion 280, thereby easily forming the adhesive layer with a uniform thickness and stabilizing the optical characteristics. This configuration prevents an excess adhesive from entering the guide hole 224 and the like, thereby preventing the occurrence of a malfunction such as a failure to accurately insert the guide pins 40**.

As the resin pool structure, not only the concave portions (resin pool concave portions 280), but also convex portions may be provided. The use of concave portions as the resin pool structure makes it possible to reduce the dipping amount of adhesive, and to secure the strength in the vicinity of the guide pin insertion holes 116.

The resin pool concave portions 280 or the convex portions of the lens holding member 200*b* according to the present embodiment may be provided on the lens holding member 200*b* including the circular (cylindrical) holding holes 220 illustrated in FIG. 9.

The resin pool convex portion or the concave portion may be provided on the side of the lens holding member 200, or may be provided on the side of the spacer 300.

(Spacer 300*a* of Another Embodiment)

FIG. 12 illustrates an example of a spacer 300*a* provided with a flow path 350. The spacer 300*a* according to the present embodiment includes a frame body including the opening 311. The frame body is provided with the flow path 350 through which the opening 311 communicates with the outside of the frame body. With this configuration, outside gas or liquid (refrigerant etc.) can be introduced into the opening 311 via the flow path 350. The flow path 350 may penetrate from the one end surface 301 of the spacer main body 305 to the other end surface 302 as illustrated in FIG. 12, or the flow path 350 having a concave shape that does not penetrate the end surface of the spacer main body 305 may be formed as illustrated in FIG. 13.

(Spacer 300*b* of Another Embodiment)

FIG. 13 is a schematic perspective view illustrating an example of a spacer 300*b* provided with two or more flow paths 350. In the present embodiment, two flow paths 351 and 352 are provided to be opposed to the one end surface 301 and the other end surface 302 of the spacer main body 305 (on the front and back surfaces of the frame body portion), and the flow paths 351 and 352 can be formed at the top and bottom of the frame body. The provision of the plurality of flow paths 351 and 352 enables air in the opening 311 of the frame body to escape to the outside through the flow path 351 and to be easily replaced with refrigerant when the optical connector including the spacer 300*a* is immersed in the refrigerant.

(Spacer 300*c* of Another Embodiment)

FIG. 14 is a schematic perspective view illustrating an example of a spacer 300*c* provided with a penetrating portion 331 formed as the light guide portion on the spacer main body 305. The penetrating portion 331 is a through-hole formed by integrating the opening 311 for guiding an optical signal with the guide holes 320 for inserting the guide pin 40. This spacer 300*c* may be further provided with the flow path 350.

(Spacer 300*d* of Another Embodiment)

FIG. 15 is a schematic perspective view illustrating an example of a spacer 300*d* provided with a penetrating portion 332 formed as the light guide portion on the spacer main body 305. The penetrating portion 332 according to the present embodiment is formed to penetrate the plate-shaped spacer main body 305 in a slit shape. Accordingly, the penetrating portion 332 according to the present embodiment has a configuration in which the opening 311 for guiding an optical signal, the guide holes 320 for inserting the guide pins 40, and the flow path 350 for introducing liquid or the like are integrated together. A back portion of the penetrating portion 332 is provided at a position corresponding to the guide holes.

(Spacer 300*e* of Another Embodiment)

FIG. 16 is a schematic perspective view illustrating an example of a spacer 300*e* provided with a plurality of openings 312 on the spacer main body 305. The plurality of openings 312 are provided such that the central axis of each opening matches the GRIN lens 250. The diameter of each opening 312 is set to be equal to or larger than the diameter of an optical surface of the GRIN lens 250. With this configuration, the plurality of openings 312 are provided for each GRIN lens 250, and thus penetration of stray light from the adjacent GRIN lenses 250 can be reliably prevented.

(Spacer 300*f* of Another Embodiment)

FIG. 17 illustrates an example of a spacer 300*f* according to still another embodiment. The entire spacer 300*f* is formed of a transparent resin or glass having a predetermined refractive index. In this case, the spacer main body 305 of the spacer 300*f* functions as the light guide portion 310. Accordingly, the spacer 300*f* is provided with the guide holes 320, but need not be provided with a through-hole (opening 311, etc.).

In this case, the spacer 300*f* is brought into close contact or bonded with the lens holding member 200, and thus is configured to prevent liquid from entering the optical path even when the spacer is immersed in refrigerant or the like. With this configuration, the connection loss can be reduced without the influence of liquid. While FIG. 17 illustrates an example where the spacer 300*f* is formed of resin or glass having a predetermined thickness, the spacer is not limited to this example. The spacer 300*f* may be formed of a resin film or the like.

(Spacer 300*g* of Another Embodiment)

FIG. 18 illustrates an example where the guide holes 320 of the spacer 300*f* (FIG. 17) are formed as guide holes 321 in a slit shape that penetrates the outer peripheral surface 303 of the spacer main body 305. In this case, the spacer 300*g* can be easily processed.

In the present invention, the optical connector connecting structure 1 corresponds to an "optical connector connecting structure", the optical fiber 30 corresponds to an "optical fiber", the first ferrule 110 corresponds to a "first ferrule", the second ferrule 120 corresponds to a "second ferrule", the optical fiber insertion hole 114 corresponds to an "optical fiber insertion hole", the guide pin insertion hole 116 corresponds to a "guide pin insertion hole", the first end surface 112 corresponds to a "first end surface", the lens holding member 200 corresponds to a "lens holding member", the member main body 210 corresponds to a "member main body", the GRIN lens 250 corresponds to a "GRIN lens", the second optical connector 20 corresponds to a "second optical connector", and the spacer 300 correspond to a "spacer".

While preferred embodiments of the present invention have been described above, the present invention is not limited only to these embodiments. It can be understood that various other embodiments can be made without departing from the spirit and scope of the present invention. Although operations and effects obtained by the configurations according to the present invention are described in the embodiments of the present invention, these operations and effects are merely examples and are not intended to limit the present invention.

REFERENCE SIGNS LIST

1 optical connector connecting structure
10 first optical connector (optical connector)

20 second optical connector
30 optical fiber
40 guide pin
110 first ferrule
114 optical fiber insertion hole
116 guide pin insertion hole
120 second ferrule
200 lens holding member
210 member main body
212 lower-side plate member
214 upper-side plate member
216 concave portion
220 holding hole
224 guide hole (guide pin insertion hole)
250 GRIN lens
300 spacer
310 light guide portion
311 opening
320 guide hole (guide pin insertion hole)
350 flow path

The invention claimed is:

1. An optical connector comprising:

a first ferrule including a first end surface provided with optical fiber insertion holes into which optical fibers are inserted, and with a pair of guide pin insertion holes into which a pair of guide pins are inserted;

a plate-shaped lens holding member bonded to the first end surface of the first ferrule via a refractive index matching adhesive layer; and a spacer provided on an opposite side of the first end surface of the lens holding member, wherein the lens holding member includes a member main body and GRIN lenses provided on the member main body, wherein the spacer includes a light guide portion that allows light transmitted through the GRIN lenses to pass, wherein the GRIN lenses are optically coupled to the optical fibers, and wherein the light guide portion includes an opening filled with refrigerant.

2. The optical connector according to claim 1, wherein the light guide portion of the spacer has a refractive index of 1.2 or more to 1.6 or less.

3. The optical connector according to claim 1, wherein the refrigerant is fluorinated refrigerant.

4. The optical connector according to claim 1, wherein the spacer includes a frame body, and the frame body includes two or more flow paths.

5. The optical connector according to claim 1, wherein the first end surface of the first ferrule and/or the member main body of the lens holding member is provided with a refractive index matching adhesive resin pool concave portion or convex portion.

6. An optical connector connecting structure comprising:

a first ferrule including a first end surface provided with optical fiber insertion holes into which optical fibers are inserted, and with a pair of guide pin insertion holes into which a pair of guide pins are inserted;

a plate-shaped lens holding member bonded to the first end surface of the first ferrule via a refractive index matching adhesive layer;

a second optical connector disposed to be opposed to the first end surface of the first ferrule; and a spacer including a light guide portion disposed between the lens holding member and the second optical connector, the light guide portion being configured to allow light to pass between the lens holding member and the second optical connector, wherein the lens holding member includes a plate-shaped member main body and GRIN lenses provided on the member main body, wherein the GRIN lenses are aligned with an end surface of the optical fibers inserted into the optical fiber insertion holes, and wherein the light guide portion includes an opening filled with refrigerant.

7. The optical connector connecting structure according to claim 6, wherein the second optical connector includes a second ferrule including a second end surface, and wherein the second end surface of the second ferrule is provided with optical fiber insertion holes into which optical fibers are inserted, and with a pair of guide pin insertion holes into which a pair of guide pins are inserted.

8. An optical packaging circuit comprising:

a refrigerant tank containing refrigerant; and an electronic component, the electronic component being immersed in the refrigerant contained in the refrigerant tank, wherein an optical connector to be connected to the electronic component includes:

a first ferrule including a first end surface provided with optical fiber insertion holes into which the optical fibers are inserted, and with a pair of guide pin insertion holes into which a pair of guide pins are inserted; and a plate-shaped lens holding member bonded to the first end surface of the first ferrule via a refractive index matching adhesive layer, wherein the lens holding member includes a member main body and GRIN lenses provided on the member main body, wherein the GRIN lenses are aligned with end surfaces of the optical fibers inserted into the optical fiber insertion holes, wherein the lens holding member includes a first surface corresponding to the first end surface of the first ferrule, and a second surface on an opposite side of the first surface, and a spacer is disposed on the second surface of the lens holding member, wherein the spacer includes an opening through which light transmitted through the GRIN lenses are allowed to pass, and wherein the opening is filled with the refrigerant.

* * * * *